United States Patent Office 3,839,527
Patented Oct. 1, 1974

3,839,527
WATER AND ORGANIC SOLVENT RESISTANT CELLULOSE ACETATE-METHYLOLATED GUANAMINE POLYMER FIBER
Albin Frank Turbak, Convent Station, and John R. Thelman, Kenvil, N.J., assignors to International Telephone and Telegraph Corporation, New York, N.Y.
No Drawing. Filed Oct. 12, 1973, Ser. No. 405,763
Int. Cl. C08g 37/32; D01f 3/28
U.S. Cl. 264—200                                    11 Claims

ABSTRACT OF THE DISCLOSURE

Cellulose acetate fibers of improved water and organic solvent resistance. The fibers are prepared by mixing cellulose acetate containing free hydroxyl groups, in an acetone spinning solution, with from 2 to 20% by weight of an acetone-soluble methylolated guanamine polymer having at least one

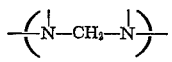

linkage between guanamine molecules, a degree of polymerization of between 2 and 10 and between 30 and 80% of its free methylol groups alkylated with a 1 to 4 carbon atom alkyl group. Fibers are spun from the solution and heat set in fiber or fabric form.

---

This invention relates to a process for improving the properties of cellulose acetate fibers and to the products produced thereby. More specifically, this invention relates to the production of cellulose acetate fibers and fabrics having significantly improved water and organic solvent resistance.

Many attempts have been made to utilize nitrogen-formaldehyde reaction products including aminotriazine resins to improve one or more properties of cellulosic materials. U.S. Pat. 2,995,416, for example, discloses the addition of small amounts of methylol melamines to cellulose esters to obtain, upon heating, a matted cellulosic fiber. U.S. Pats. 2,796,656; 2,858,185 and 3,016,258 describe the addition of methylol monoamide polymers to viscose solutions to produce regenerated cellulose articles of reduced water-sensitivity. However, the polymers shown in these patents are not only chemically different from those of the present invention but also are not soluble in acetone and hence are not useful in the production of acetone soluble cellulose esters.

U.S. Pat. 2,684,343 discloses the addition of alkylated polymethylol melamine resins to cellulose solutions to produce viscose rayon of decreased water absorption. U.S. Pat. 2,706,718 discloses the addition of guanamine aldehyde condensation products to viscose rayon dopes to improve the properties of the resulting cellulosic fibers, including their water absorption characteristics. However, here again, the melamine and guanamine resins disclosed are largely water soluble and acetone insoluble and hence not useful with acetone soluble cellulose acetate.

Therefore, in spite of the many and varied efforts that have been devoted to incorporating melamine-formaldehyde or related nitrogen-containing resins into cellulosic products, none insofar as is known has been successful in the production of a superior cellulose acetate fiber.

It is accordingly a primary object of the present invention to provide a cellulose acetate fiber of improved water and organic solvent resistance by controlled reaction of the acetate with certain guanamine resin polymers.

It is an additional object of this invention to provide an improved cellulose acetate fiber which is crosslinked by heat alone without recourse to degradative processes employing acid or other catalysts.

It is still an additional object of this invention to provide cellulose acetate yarns which are crosslinked after the texturing process to form permanently textured yarns.

It is yet an additional object of this invention to provide a cellulose acetate fabric which is made shrink-resistant and dimensionally stable by controlled crosslinking of the fabric.

In accordance with the invention, the water-sensitivity, cross-sectional swelling in water, and water retention capacity of cellulose acetate fibers or yarns are decreased by addition to the acetate spinning solution of from 2 to 20% by weight of an acetone-soluble methylolated guanamine polymer having at least one

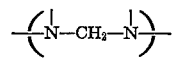

linkage between guanamine molecules, a degree of polymerization of between 2 and 10 and between 30 and 80% of its free methylol groups alkylated with a 1 to 4 carbon atom alkyl group. Fibers spun from the foregoing spinning solution can be rapidly heat-set without acid catalysis, either in fiber or fabric form. Further, while the poly/acetate solution can be safely handled and spun, the subsequently shaped and cured fibers retain texture and crimp and are solvent insoluble. Spinning solution viscosities, yarn dye-ability, hand, luster, strength and other normal properties of the acetate are not significantly altered.

The term guanamine refers to a class of compounds chemically identified as 2,4-diamino-6-substituted-s-triazines. The substitutent in the six position on the triazine ring is a hydrocarbon, or a halo- or nitro-substituted hydrocarbon group. The hydrocarbon may be a 1 to 22, preferably a 12 to 18 carbon atom alkyl group; an aryl group such as phenyl; an aralkyl group (such as benzyl); an alkaryl group such as tolyl or xylyl; or a cycloalkyl group of more than 2, and preferably from 6 to 10 carbon atoms such as cyclohexyl. Benzoguanamine, a commercially available guanamine, is particularly useful in the practice of the invention. Other guanamines such as stearoguanamine may be used.

The acetone solubility and the reactivity of the polymers is critical to the success of the invention. Acetone solubility is a function of the proper type and amount of alkyl "capping" in combination with the presence of the

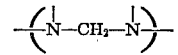

linkage. The reactivity is dependent on both the amount of pre-polymerization of the polymer to form

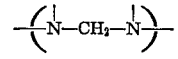

linkages and the amount of free methylol remaining unalkylated. The guanamine resins useful in the invention must be true polymers in the sense that they have at least a dimer structure—that is, at least two, and no more than ten, guanamine rings connected through

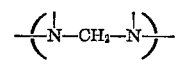

bridges. Preferably the polymers contain from three to six guanamine rings connected respectively by from 2 to 5

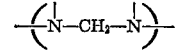

linkages. The available valence on the two nitrogen atoms, other than that connected to the guanamine molecule, may be hydrogen, —CH$_2$OR or —CH$_2$OR in which R is a 1 to 4 carbon alkyl group. Beyond a degree of polymerization of ten, the polymer begins to self-crosslink, is not soluble in acetone and hence is not useful. A preferred degree of polymerization is from 3 to 6.

The polymer is partially "capped" or alkylated both to render the polymer soluble in the acetone solvent and to sufficiently control its reactivity to render it labile through the various processing steps up to and including spinning. At the same time, the polymer must not be alkylated too fully, otherwise its reactivity is insufficient to trigger reaction with the acetate when the fiber or fabric is heat set. Accordingly, the degree of alkylation must be between 30 and 80% of the free methylol groups.

The method of preparation of the guanamine polymers is well known and forms no part of the instant invention. Preparation of the polymers is disclosed, for example, in Encyclopedia of Polymer Science and Technology, Vol. 2, 1965, pages 17–21. Briefly, they are prepared by reacting the guanamine with a formaldehyde solution, heating to form the polymer, adding a 1 to 4 carbon lower aliphatic alcohol and heating to alkylate the polymer. More than 2 but less than 4 moles of formaldehyde should be used for each mole of guanamine, preferably 2.5 to 3.5 moles of formaldehyde per mole of guanamine. An amount of the alcohol should be then added per each mole of methylol to assure from 30% to 80% capping, which is from 1.0 to 2.0 moles of alcohol per mole of guanamine.

From 2 to 20% by weight of the foregoing guanamine polymer is added to a cellulose acetate spinning solution prepared in known fashion. The cellulose acetate solution contains cellulose acetate having free hydroxyl groups dissolved in an acetone solvent. The cellulose acetate is a diacetate having a degree of substitution of acetyl groups of from 2.05 to 2.77 or from 35.5% to 42.8% acetyl groups based on the weight of cellulose acetate. After addition of the polymer to the solution, the mixture is stirred, filtered, deaerated, spun and the spun fiber stretched, all in known fashion. The preparation of such cellulose diacetate spinning solutions and the spinning of fibers therefrom is more fully described, for example in Encyclopedia of Polymer Science and Technology, Vol. 3, 1965, pages 432 to 435. Reference to this text should be made for a more detailed description of thhe preparation of the acetate fibers. The fibers may then be textured or crimped. Such processes are also well known to those skilled in the art. Suitable methods of texturing or crimping fibers are disclosed for example in U.S. Pats. 2,575,837; 2,575,839 and 3,012,397, and in *Woven Stretch and Textured Fabrics*, B. L. Hawthrone, John Wiley & Sons, 1964.

The fibers are then heat set to crosslink and react the cellulose acetate-guanamine polymer in either fiber (or yarn) or fabric form. The temperatures and times of heat setting are dependent on each other, on the specific melamine polymers used including their degree of reactivity, the yarn denier and the resin concentration. In general, heat setting or curing may be accomplished by bringing the yarn to from 150° C. to 250° C., preferably from 175° C. to 230° C., in hot air—as in an oven or between hot wires—or in an oil bath such as a silicone oil. The time may vary from a few seconds to an hour or more, generally from 5 seconds to 45 minutes. At higher temperatures, e.g. 220° C., times of from 5 to 15 seconds are adequate. At lower temperatures, e.g. 175° C., times of 5 to 15 minutes should be used. At intermediate temperatures, e.g. 200° C., from 1 to 2 minutes has been found adequate.

It is important to note that curing of the fibers of the invention occurs rapidly and needs no acid or other catalysis. The fibers are cured with heat alone. This is an important advantage because acid catalysis, including even a mild acid, normally degrades the acetate fiber, reducing its strength and leading to yellowing or other coloring problems with the fiber.

An important advantage of the heat set products of the invention, in addition to their water and organic solvent resistance, are their shrink resistance and dimensional stability. The heat set cellulose acetate yarns or fabrics of the invention will retain their shape and textured crimped condition after repeated laundering, a property heretofore generally associated wiht heat set nylons and polyesters. Moreover, the acetate yarns of the invention retain their outer hydrophilic nature and thus combine comfort with shrink resistance and dimensional stability.

The following examples illustrate the practice of the invention. All parts and percentages are by weight.

Example 1

A solution is prepared by dissolving 970 grams of cellulose acetate (910 grams oven dry, 39.4% acetyl) in 2,870 grams of acetone. Total solution water content is adjusted to 2%. Mixing is accomplished using a helical mixer over a 16 hour period. To this solution is added 60 grams of a commercially available benzoguanamine-formaldehyde polymer (100% solids) in 100 grams of acetone. The polymer is prepared from 3.0 moles of formaldehyde for each mole of benzoguanamine with 1.25 moles of butanol per mole of benzoguanamine used in capping. The polymer has a degree of polymerization of 4, an approximate molecular weight of 1200, is 55% alkylated with butyl groups and contains 45% free methylol groups. After addition of the polymer, the resulting mixture is stirred for an additional 4 hours prior to a double stage pressure filtration. The solution is then deaerated on standing for 12 hours. The resulting acetone spin dope is then spun through a 40 hole (0.06 mm.) spinnerette at a head pressure of 300 to 400 p.s.i.g. with a head temperature of 60 to 70° C. Jetting rate is approximately 30 ml./min. with a takeup of 1100 linear feet/minute. This yields a stretch of 14%. Cell jacket temperature is maintained at 115° C. during spinning. The resultant 200 denier acetate yarn is twisted at 2.5 turns/inch.

Example 2

As a control, an additional yarn sample was prepared in accordance with the procedure of Example 1 except that no guanamine resin was added. An additional 60 grams of cellulose acetate in 100 grams of acetone was added in place of the melamine resin.

The fibers of Examples 1 and 2 were heat set in both yarn and fabric form. Heat setting was carried out until solubility of the yarn or fabric in acetone did not appreciably decrease. In general, the yarns were heat set in a forced air oven at a temperature of 175 to 220° C. for from 5 seconds to 45 minutes. Fabrics knit from the yarns, prior to cure, were heat set at similar temperatures for from 5 seconds to 25 minutes. Properties of the heat set yarns and fabrics are set forth in the following Table. The "relative cure rate" was measured on a scale of 1 to 10 as determined at 220° C. in silicone oil for times ranging from 5 seconds to 2 minutes.

| Example number | Resin type | Percent resin | Relative cure rate [a] | Heat set fabric | | Heat set fiber | | |
|---|---|---|---|---|---|---|---|---|
| | | | | Acetone solubility (percent) | Water retention (percent) [b] | Wet elong. minus dry elong. (percent) | Tenacity (grams/denier) | |
| | | | | | | | Cond. | Wet |
| 1 | Benzoguanamine-formaldehyde | 6 | 10 | 27 | 15.0 | 5.1 | 1.50 | 0.90 |
| 2 | None | | | 97 | 21.0 | 9.2 | 1.46 | 0.98 |

[a] 1 fastest, 10 slowest.
[b] Percent water weight retained after centrifuging vs. after dried.

The table shows that the samples of fabrics prepared in accordance with the invention had lower water retention and considerably lower acetone solubility than control Example 2. In addition, the fibers of Example 1 show a considerably reduced wet elongation. These results demonstrate the marked reduction of water sensitivity of the fibers of the invention.

Example 3

An additional sample is prepared by following the procedure of Example 1 but using a benzoguanamine-formaldehyde polymer having a degree of polymerization of two, a molecular weight of 650, containing 33% butyl capping and 67% free methylol groups. The results are similar to those set forth for Example 1 in organic solvent resistance. Water sensitivity is slightly less. The higher proportion of free methylol groups renders the polymer more reactive and hence the cure rate is higher.

Example 4

An additional sample is prepared by following the procedure of Example 1 but using a benzoguanamine-formaldehyde polymer having a degree of polymerization of five, a molecular weight of 1400, containing 75% methyl capping and 25% free methylol groups. The fibers' reactivity and cure rate is about as fast as that of Example 3, its water sensitivity is substantially the same.

Example 5

A sample is prepared following the procedure of Example 1 but using a benzoguanamine-formaldehyde polymer having a D.P. of 4 and a molecular wt. of 1200 but having all of its methylol groups capped with Methyl substituent, thus leaving 0% of free methyl. The product on curing in a hot oven at 175° C. for 15 minutes was not x-linked and was 53% soluble in acetone. This demonstrates the need for controlling the amount of methylol capping.

We claim:

1. A process for preparing a cellulose acetate fiber having improved water and organic solvent resistance comprising mixing cellulose acetate containing free hydroxyl groups, dissolved in an acetone spinning solution, with from 2 to 20% by weight of an acetone-soluble methylolated guanamine polymer, said polymer having at least one

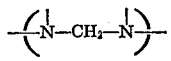

linkage between guanamine molecules, a degree of polymerization of between 2 and 10 and between 30 and 80% of its free methylol groups alkylated with a 1 to 4 carbon atom alkyl group, spinning a fiber from said solution and heat setting said fiber.

2. The process of Claim 1 in which the guanamine polymer is prepared from guanamine and formaldehyde, the mole ratio of formaldehyde to guanamine in the polymer being more than 2 and less than 4.

3. The process of Claim 1 in which the guanamine is benzoguanamine.

4. The process of Claim 1 in which the degree of polymerization of the guanamine polymer is from 3 to 6.

5. The process of Claim 1 in which the guanamine polymer is alkylated with from 1.0 to 2.0 moles of a 1 to 4 carbon aliphatic alcohol.

6. The process of Claim 1 in which the fiber is textured prior to heat setting.

7. The process of Claim 1 in which a fabric is prepared from the fiber prior to heat setting and the fabric is then heat set.

8. A cellulose acetate fiber having improved water and organic solvent resistance comprising the heat set fiber spun from an acetone solution of a mixture of cellulose acetate containing free hydroxyl groups and 2 to 20% by weight of an acetone-soluble methylolated guanamine polymer, said polymer having at least one

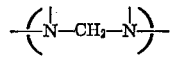

linkage between guanamine molecules, a degree of polymerization of between 2 and 10 and between 30 and 80% of its free methylol groups alkylated with a 1 to 4 carbon atom alkyl group.

9. The fiber of Claim 7 in which the fiber is heat set in a permanently textured condition.

10. The fiber of Claim 7 which is heat set in fabric form.

11. The fiber of Claim 7 in which the guanamine polymer has a degree of polymerization of from 3 to 6.

References Cited

UNITED STATES PATENTS

| | | | |
|---|---|---|---|
| 2,317,131 | 4/1943 | Conaway | 260—15 |
| 2,375,838 | 5/1945 | Coolidge et al. | 260—15 |
| 2,684,343 | 7/1954 | Dixon et al. | 260—15 |
| 2,706,718 | 4/1955 | Dixon et al. | 260—15 |
| 2,995,416 | 8/1961 | Ernst | 264—115 |
| 3,491,037 | 1/1970 | Keys et al. | 260—15 |

WILLIAM H. SHORT, Primary Examiner

E. WOODBERRY, Assistant Examiner

U.S. Cl. X.R.

260—15; 264—176 F, 207